US011360610B2

(12) United States Patent
Fan et al.

(10) Patent No.: US 11,360,610 B2
(45) Date of Patent: Jun. 14, 2022

(54) TOUCH CONTROL SUBSTRATE, METHOD FOR FABRICATING THE SAME, AND TOUCH CONTROL DISPLAY DEVICE (71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Wenjin Fan, Beijing (CN); Lei Zhang, Beijing (CN); Tsungchieh Kuo, Beijing (CN); Zhi Zhang, Beijing (CN); Xiaoyue He, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 944 days.

(21) Appl. No.: 16/067,919

(22) PCT Filed: Dec. 15, 2017

(86) PCT No.: PCT/CN2017/116538
§ 371 (c)(1),
(2) Date: Jul. 3, 2018

(87) PCT Pub. No.: WO2018/126873
PCT Pub. Date: Jul. 12, 2018

(65) Prior Publication Data
US 2021/0165526 A1 Jun. 3, 2021

(30) Foreign Application Priority Data

Jan. 3, 2017 (CN) .......................... 201710002807.2

(51) Int. Cl.
G06F 3/044 (2006.01)

(52) U.S. Cl.
CPC ............ *G06F 3/044* (2013.01); *G06F 3/0443* (2019.05); *G06F 3/0446* (2019.05); *G06F 2203/04103* (2013.01); *G06F 2203/04107* (2013.01)

(58) Field of Classification Search
CPC ...... G06F 3/044; G06F 3/0446; G06F 3/0443; G06F 2203/04103; G06F 2203/04107; G06F 3/04164; G06F 3/0412
See application file for complete search history.

(56) References Cited

U.S. PATENT DOCUMENTS

2010/0110037 A1* 5/2010 Huang .................. G06F 3/0445
345/174
2010/0182275 A1* 7/2010 Saitou ................... G06F 3/0446
345/174

(Continued)

FOREIGN PATENT DOCUMENTS

CN 102081484 A 6/2011
CN 102866811 A 1/2013

(Continued)

OTHER PUBLICATIONS

Office Action dated Feb. 19, 2019 issued in corresponding Chinese Application No. 201710002807.2.

(Continued)

*Primary Examiner* — Amy Onyekaba
(74) *Attorney, Agent, or Firm* — Nath, Goldberg & Meyer; Joshua B. Goldberg (57) ABSTRACT A touch control substrate, a method for fabricating the same, and a touch control display device are provided. The touch control substrate includes a touch control region and a peripheral region surrounding the touch control region. Signal traces and a shielding wire are provided in the peripheral region, the shielding wire being configured to shield interference of the signal traces to the touch control region.

18 Claims, 4 Drawing Sheets

(56) References Cited

U.S. PATENT DOCUMENTS

| | | | | |
|---|---|---|---|---|
| 2011/0032207 A1* | 2/2011 | Huang | G06F 3/0443 | 345/174 |
| 2011/0090159 A1* | 4/2011 | Kurashima | G06F 3/0445 | 200/600 |
| 2011/0316803 A1* | 12/2011 | Kim | G06F 3/044 | 345/173 |
| 2012/0075214 A1* | 3/2012 | Kim | G06F 3/041 | 345/173 |
| 2012/0075218 A1* | 3/2012 | Lin | G06F 3/0418 | 345/173 |
| 2012/0075237 A1* | 3/2012 | Ikeda | G06F 3/0412 | 345/174 |
| 2012/0086655 A1* | 4/2012 | Wang | G06F 3/0446 | 345/173 |
| 2012/0120011 A1* | 5/2012 | Teng | G06F 3/0446 | 345/173 |
| 2012/0127094 A1* | 5/2012 | Jeong | G06F 3/0446 | 345/173 |
| 2012/0235927 A1* | 9/2012 | Ho | G06F 3/0446 | 345/173 |
| 2013/0062179 A1* | 3/2013 | Ye | G06F 3/041 | 29/850 |
| 2013/0093696 A1* | 4/2013 | Huang | G06F 3/0446 | 345/173 |
| 2013/0201122 A1* | 8/2013 | Kurashima | G06F 3/0445 | 345/173 |
| 2013/0271675 A1* | 10/2013 | Misaki | G02F 1/13338 | 345/173 |
| 2013/0321304 A1* | 12/2013 | Wang | G06F 3/041 | 200/305 |
| 2013/0335355 A1* | 12/2013 | Ding | G06F 3/0416 | 200/305 |
| 2014/0071064 A1* | 3/2014 | Cho | G06F 3/0443 | 345/173 |
| 2014/0111476 A1* | 4/2014 | You | G09G 3/3655 | 345/174 |
| 2014/0177137 A1* | 6/2014 | Kuo | H05K 9/0054 | 361/679.01 |
| 2014/0198060 A1* | 7/2014 | Wu | G06F 3/0443 | 345/173 |
| 2015/0193059 A1* | 7/2015 | Reynolds | G06F 3/0412 | 345/174 |
| 2015/0317011 A1* | 11/2015 | Chen | G06F 3/0446 | 345/174 |
| 2016/0018922 A1* | 1/2016 | Wang | G02F 1/13338 | 345/87 |
| 2016/0132148 A1* | 5/2016 | Han | H01L 27/323 | 345/174 |
| 2016/0149401 A1* | 5/2016 | Chen | H02H 9/044 | 361/56 |
| 2016/0179254 A1* | 6/2016 | Kurashima | G06F 3/0445 | 345/174 |
| 2016/0179255 A1* | 6/2016 | Yang | G09G 3/2092 | 345/173 |
| 2016/0299594 A1* | 10/2016 | Zhang | G06F 3/0443 | |
| 2017/0090652 A1* | 3/2017 | Sato | G06F 3/044 | |
| 2017/0139525 A1* | 5/2017 | Jo | H01L 51/529 | |
| 2017/0156202 A1* | 6/2017 | Zhang | H05K 1/0216 | |
| 2017/0285383 A1* | 10/2017 | Zhou | G06F 3/04164 | |
| 2018/0018051 A1* | 1/2018 | Ogura | G02F 1/1343 | |
| 2018/0129104 A1* | 5/2018 | Morimoto | G02F 1/136286 | |
| 2018/0182822 A1* | 6/2018 | Seo | H01L 27/3276 | |
| 2018/0252955 A1* | 9/2018 | Kurasawa | G06F 3/04164 | |
| 2019/0018521 A1* | 1/2019 | Aoshima | G06F 3/04164 | |

FOREIGN PATENT DOCUMENTS

| | | | |
|---|---|---|---|
| CN | 105824448 A | * | 8/2016 |
| CN | 105824448 A | | 8/2016 |
| CN | 106843616 A | | 6/2017 |
| KR | 10-2008-0092633 A | | 10/2008 |
| KR | 10-2017-0081068 A | | 7/2017 |

OTHER PUBLICATIONS

International Search Report dated Mar. 21, 2018 issued in corresponding International Application No. PCT/CN2017/116538.

* cited by examiner

FIG. 7 under 35 U.S.C.
TOUCH CONTROL SUBSTRATE, METHOD FOR FABRICATING THE SAME, AND TOUCH CONTROL DISPLAY DEVICE

CROSS-REFERENCE TO RELATED APPLICATION

This is a National Phase Application filed under 35 U.S.C. 371 as a national stage of PCT/CN2017/116538, filed Dec. 15, 2017, an application claiming the benefit of Chinese Application No. 201710002807.2, filed Jan. 3, 2017, the content of each of which is hereby incorporated by reference in its entirety.

TECHNICAL FIELD

The present disclosure relates to the field of display technology, in particular, to a touch control substrate, a method for fabricating the same, and a touch control display device.

BACKGROUND

With the rapid development of smartphones and tablet computers, touch panels have been widely used in daily life. Currently, the most popular is the capacitive touch panel in which the position of a finger is calculated by the touch panel using the current generated by the change in capacitance when the finger is in contact with the panel.

In general, a touch control substrate includes a touch control region and a peripheral region. The touch control region is a region on which an image can be seen and which can be touched by a user. The peripheral region includes plural signal traces for providing control signals to touch control electrodes disposed in the touch control region and communicating touch control signals collected by the touch control electrodes.

With the development of the touch panel, it is required that a touch panel has an increased touch resolution; however, in this case, a non-uniform capacitance distribution in the periphery of the touch panel may have a greater impact on the product quality and performance.

SUMMARY

In view of the above problem existing in the prior art, the present disclosure provides a touch control substrate and a method for fabricating the same, to at least partially alleviate the problem that there is a non-uniform capacitance distribution in the touch control region of the existing touch panel.

According to an aspect of the present disclosure, provided is a touch control substrate including a touch control region and a peripheral region surrounding the touch control region. Signal traces and a shielding wire are provided in the peripheral region, the shielding wire being configured to shield interference of the signal traces to the touch control region.

According to embodiments of the present disclosure, at least a part of the shielding wire may be provided between the signal traces and the touch control region.

According to embodiments of the present disclosure, the touch control substrate may further include: a base substrate; a conductive layer provided above the base substrate, the conductive layer being partially provided in the touch control region and the peripheral region so as to be electrically connected to touch control electrodes provided in the touch control region; a first insulation layer located above the conductive layer, a first via being provided in the first insulation layer to expose the conductive layer provided below the first insulation layer; and a metal pattern layer located above the first insulation layer, the metal pattern layer including the signal traces and the shielding wire. The signal traces may be electrically connected to the conductive layer provided below the first insulation layer through the first via in the first insulation layer.

According to embodiments of the present disclosure, the touch control substrate may further include: a base substrate; a metal pattern layer provided above the base substrate, the metal pattern layer including the signal traces and the shielding wire; a first insulation layer located above the metal pattern layer, a second via being provided in the first insulation layer to expose the signal traces provided below the first insulation layer; and a conductive layer provided above the first insulation layer, the conductive layer being partially provided in the touch control region and the peripheral region so as to be electrically connected to touch control electrodes provided in the touch control region. The signal traces may be electrically connected to the conductive layer provided above the first insulation layer through the second via in the first insulation layer.

According to embodiments of the present disclosure, a width of the shielding wire may be larger than or equal to 300 µm and smaller than or equal to 500 µm, or a width of the shielding wire may be larger than or equal to 150 µm and smaller than 300 µm.

According to embodiments of the present disclosure, the shielding wire may have an opening.

According to embodiments of the present disclosure, there may not be a signal trace provided at a side of the opening distal to the touch control region.

According to embodiments of the present disclosure, the touch control substrate may further include: a grounding device located in a periphery of the signal traces The grounding device may be electrically connected to the shielding wire.

According to embodiments of the present disclosure, at least one of the grounding device and the shielding wire may have an opening.

According to embodiments of the present disclosure, the grounding device may have an opening, and the signal traces may not be provided at either side of the opening.

According to embodiments of the present disclosure, a line-connection region for connecting to an external integrated circuit or an external flexible printed circuit board may be provided in the peripheral region, a grounding terminal may be provided in the line-connection region, and the shielding wire may be electrically connected to the grounding terminal.

According to embodiments of the present disclosure, the touch control substrate may be a capacitive touch control substrate.

According to another aspect of the present disclosure, provided is a method for fabricating a touch control substrate, the touch control substrate including a touch control region and a peripheral region surrounding the touch control region, the method including: forming signal traces and a shielding wire in the peripheral region. At least a part of the shielding wire is provided between the signal traces and the touch control region.

According to embodiments of the present disclosure, the method for fabricating a touch control substrate may further include: forming a conductive layer above a base substrate with a black matrix having been formed thereon, the conductive layer is partially provided in the touch control region and the peripheral region so as to be electrically connected to touch control electrodes provided in the touch control region; forming a first insulation layer above the conductive layer; forming a first via in the first insulation layer to expose the conductive layer provided below the first insulation layer; forming a metal layer above the first insulation layer, so that the metal layer fills the first via so as to be electrically connected to the conductive layer below the first insulation layer; and patterning the metal layer to form the signal traces and the shielding wire. The signal traces may be electrically connected to the conductive layer provided below the first insulation layer through the first via in the first insulation layer.

According to embodiments of the present disclosure, the method for fabricating a touch control substrate of claim may further include: forming a metal layer above a base substrate with a black matrix having been formed thereon; patterning the metal layer to form the signal traces and the shielding wire; forming a first insulation layer above the patterned metal layer; forming a second via in the first insulation layer to expose the signal traces provided below the first insulation layer; and forming a conductive layer above the first insulation layer, so that the conductive layer fills the second via so as to be electrically connected to the signal traces below the first insulation layer.

According to embodiments of the present disclosure, the peripheral region may include a line-connection region for connecting to an external integrated circuit or an external flexible printed circuit board, and the method may further include: forming a grounding terminal in the line-connection region, so that the shielding wire is electrically connected to the grounding terminal.

According to another aspect of the present disclosure, provided is a touch control display device which includes the touch control substrate according to the present disclosure.

BRIEF DESCRIPTION OF THE FIGURES

The above and other features and advantages of the present disclosure will become more apparent to those of ordinary skill in the art from the following detailed description of exemplary embodiments thereof with reference to the accompanying drawings, in which.

DETAILED DESCRIPTION

During achieving technical solutions of the present disclosure, the inventors found that at least the following problem exists in the prior art: mutual capacitance may be formed between the signal traces in the peripheral region of the touch control substrate and the elements in the display region, resulting in a non-uniform capacitance distribution in the edge of the display region; the more the signal traces in the peripheral region are, the larger the mutual capacitance is and the larger the non-uniformity of the capacitance distribution in the edge of the display region is, which results in a severe degradation of the product performance.

The present disclosure provides a touch control substrate and a method for fabricating the same, to at least partially solve the problem that there is a non-uniform capacitance distribution in the periphery of the display region, while not increasing the costs and the production processes.

The present disclosure will be described in detail below in conjunction with the accompanying drawings in order that the objects, solutions and advantages may be clearer. Obviously, the described embodiments are not exhaustive, but simply a part of the embodiments of the present disclosure. Other embodiments obtained without any creative effort by those of ordinary skill in the art based on the embodiments of the present disclosure also fall into the protective scope of the present disclosure.

The touch control substrate and the method for fabricating the same provided by the embodiments of the present disclosure will be described in detail below in conjunction with the accompanying drawings.

In the drawings, thicknesses of individual layers as well as sizes and shapes of individual regions may not be drawn to scale, but are illustrated for the purpose of explaining the contents of the present disclosure schematically. The spatial terms "above" and "below" as mentioned in the present disclosure are intended to indicate the directions in the figures. For example, if a device in a figure is turned upside down, then an element which is described herein as being "below" another element or feature may be located "above" the other element or feature. Devices may be otherwise orientated (e.g., rotated by 90 degree or in other orientation) and the orientation terms as used herein may be explained accordingly.

Figure 1:
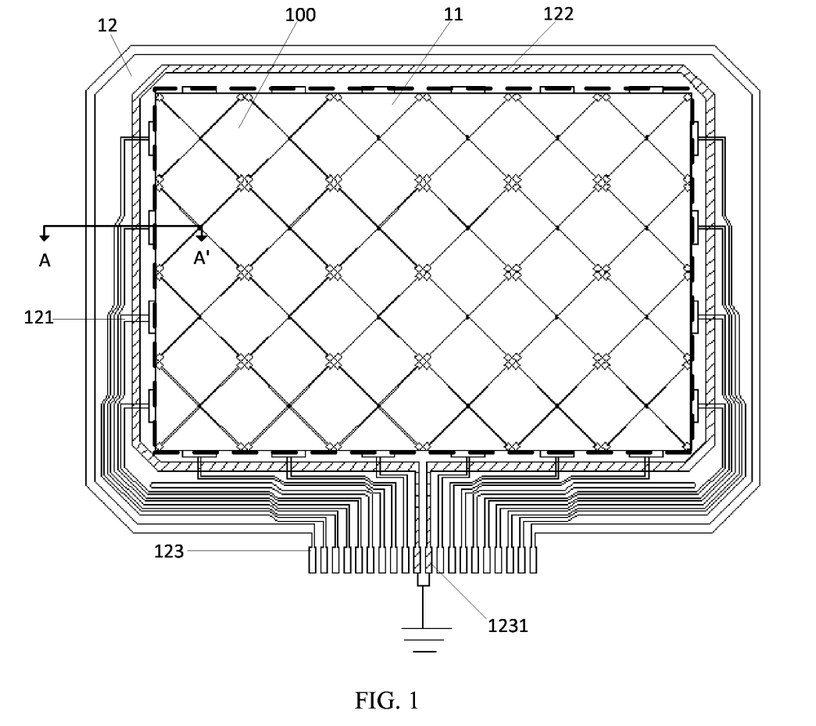
FIG. 1 is a schematic plan view of a touch control substrate according to an embodiment of the present disclosure.
Figure 2:
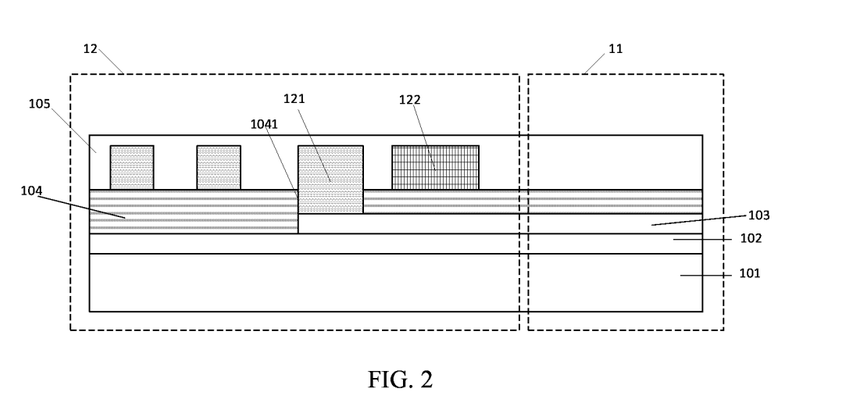
FIG. 2 is a schematic sectional view taken along a line A-A' in FIG. 1.

FIG. 1 is a schematic plan view of a touch control substrate according to an embodiment of the present disclosure, and FIG. 2 is a schematic sectional view taken along a line A-A' in FIG. 1.

As shown in FIGS. 1 and 2, the touch control substrate according to the embodiment of the present disclosure includes a touch control region 11 (i.e., a region as surrounded by the dashed line in FIG. 1) and a peripheral region 12 located around the touch control region. Signal traces 121 and a shielding wire 122 are provided in the peripheral region 12. The shielding wire 122 is configured to shield the interference of the signal traces 121 to the touch control region 11.

As shown in FIG. 2, the touch control substrate according to the embodiment of the present disclosure may include a base substrate 101, a black matrix 102 provided above the base substrate 101, a metal layer 103 provided above the black matrix 102, a first insulation layer 104 provided above the metal layer 103, a metal pattern layer provided above the first insulation layer 104, and a second insulation layer 105 provided above the metal pattern layer.

The metal pattern layer includes the signal traces 121 and the shielding wire 122. The first insulation layer 104 includes a first via 1041 therein. The signal traces 121 are electrically connected to the metal layer 103 through the first via 1041. The metal layer 103 is partially provided in the touch control region 11 and the peripheral region 12 so as to be electrically connected to touch control electrodes 100 provided in the touch control region 11. The signal traces 121 are electrically connected to the touch control electrodes 100 provided in the touch control region 11 by way of a corresponding metal layer 103. Transmission of signals (e.g., control signals for controlling the touch control electrodes 100 and touch control signals collected by the touch control electrodes) between the peripheral region 12 and the touch control region 11 is conducted by way of the conductive path formed by the signal traces 121, the metal layer 103 and the touch control electrodes 100.

Figure 3:
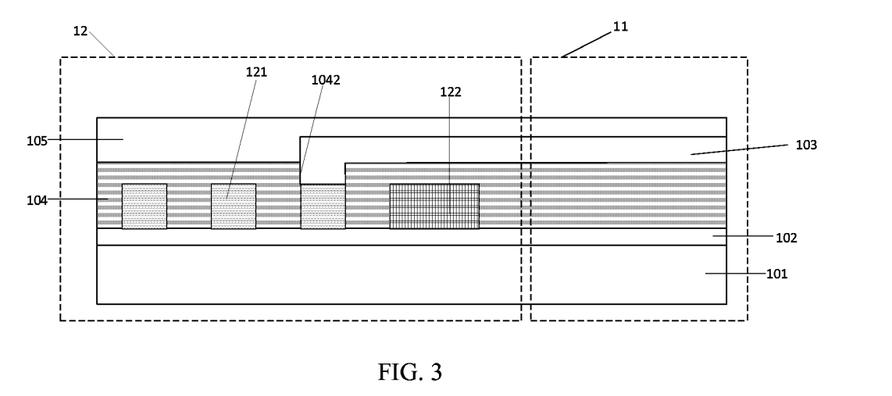
FIG. 3 is a schematic sectional view of a touch control substrate according to another embodiment of the present disclosure, taken along a line A-A' as shown in FIG. 1.

FIG. 3 is a schematic sectional view of a touch control substrate according to another embodiment of the present disclosure, taken along a line A-A' as shown in FIG. 1.

As shown in FIG. 3, the touch control substrate according to the present embodiment may include a base substrate 101, a black matrix 102 provided above the base substrate 101, a metal pattern layer provided above the black matrix 102, a first insulation layer 104 provided above the metal pattern layer, a metal layer 103 provided above the first insulation layer 104, and a second insulation layer 105 provided above the metal layer 103.

The metal pattern layer includes signal traces 121 and a shielding wire 122. The first insulation layer 104 includes a second via 1042 therein. The signal traces 121 are electrically connected to the metal layer 103 through the second via 1042. The metal layer 103 is partially provided in the touch control region 11 and the peripheral region 12 so as to be electrically connected to touch control electrodes 100 provided in the touch control region 11. The signal traces 121 are electrically connected to the touch control electrodes 100 provided in the touch control region 11 by way of a corresponding metal layer 103. Transmission of signals (e.g., control signals for controlling the touch control electrodes 100 and touch control signals collected by the touch control electrodes) between the peripheral region 12 and the touch control region 11 is conducted by way of the conductive path formed by the signal traces 121, the metal layer 103 and the touch control electrodes 100.

According to an embodiment of the present disclosure, the signal traces 121 and the shielding wire 122 may be formed in a same layer (i.e., the metal pattern layer) by a single patterning process, which can save the production time and the production costs will not be increased.

Although FIGS. 2 and 3 illustrate therein that one signal trace 121 is connected to one metal layer 103 corresponding thereto, it should be appreciated that the signal traces 121 provided in the peripheral region 12 each are connected to a metal layer 103 corresponding thereto, respectively, so as to provide the control signals to the touch control electrodes 100 provided in the touch control region 11 and communicate the touch control signals collected by the touch control electrodes 100.

According to an embodiment of the present disclosure, as shown in FIG. 1, the peripheral region 12 may further include a line-connection region 123 for connecting to an external integrated circuit or an external flexible printed circuit board. The line-connection region 123 is provided with a grounding terminal 1231 and other terminals thereon. The grounding terminal 1231 may be connected to the shielding wire 122 so as to provide a ground potential to the shielding wire 122.

According to an embodiment of the present disclosure, a width of the shielding wire 122 may be larger than or equal to 300 µm and smaller than or equal to 500 µm, or the width of the shielding wire 122 may be larger than or equal to 150 µm and smaller than 300 µm.

Specifically, taking the influence of the shielding wire 122 on the width of the bezel into account, in a general product, the width of the shielding wire 122 may be larger than or equal to 300 µm and smaller than or equal to 500 µm; in a product having a narrow bezel, the width of the shielding wire 122 may be larger than or equal to 150 µm and smaller than 300 µm since the product has a smaller wiring space therein.

The number of the signal traces 121 may be determined according to the precision requirement for products in practical production. FIG. 1 illustrates an example in which 14 signal traces 121 are provided in the peripheral region 12; however, the present disclosure is not limited thereto.

According to an embodiment of the present disclosure, the touch control substrate may be a capacitive touch control substrate. In the capacitive touch control substrate, since the shielding wire 122 provided in the peripheral region 12 achieves shielding for the signal traces 121 in the peripheral region 12, the mutual capacitance occurring between the signal traces 121 in the peripheral region and the touch control electrodes 100 in the touch control region 11 is reduced, so that the capacitance is distributed more uniformly over the edge area and the center area in the touch control region 11, and thus the accuracy of touch control is improved in the periphery of the display region.

It should be appreciated that the structures as shown in FIGS. 2 and 3 are shown merely for explaining the present disclosure, and not for limiting the present disclosure. The touch control substrate as shown in FIGS. 2 and 3 may be achieved by the 5MASK (five mask) process which is a common process in fabricating an On Glass Sensor (OGS). However, the present disclosure is not limited thereto. According to other embodiments, the touch control substrate according to the present disclosure may be achieved by, for example, the 6MASK (six mask) process and the like.

It should be further appreciated that FIGS. 1, 2 and 3 merely illustrate the structures and the wiring form of the touch control substrate according to the embodiments of the present disclosure. According to other embodiments of the present disclosure, the touch control substrate may include other substrate structures and/or wiring forms. In addition, any variations in the number, the area and the length of a trace, and so on, are included in the protective scope of the present disclosure.

According to an embodiment of the present disclosure, a part of the shielding wire 122 is located between the signal traces 121 and the touch control region 11. However, the present disclosure is not limited thereto. According to other embodiments of the present disclosure, the whole shielding wire 122 may be located between the signal traces 121 and the touch control region 11.

In the touch control substrate according to the embodiment of the present disclosure, at least a part of the shielding wire 122 is located between the signal traces 121 and the touch control region 11, thereby the mutual capacitance occurring between the signal traces 121 and the touch control region 11 which are located at two sides of the shielding wire 122 may be shielded, and the problem that the capacitance in the edge of the touch control region is distributed non-uniformly is alleviated.

Figure 4:
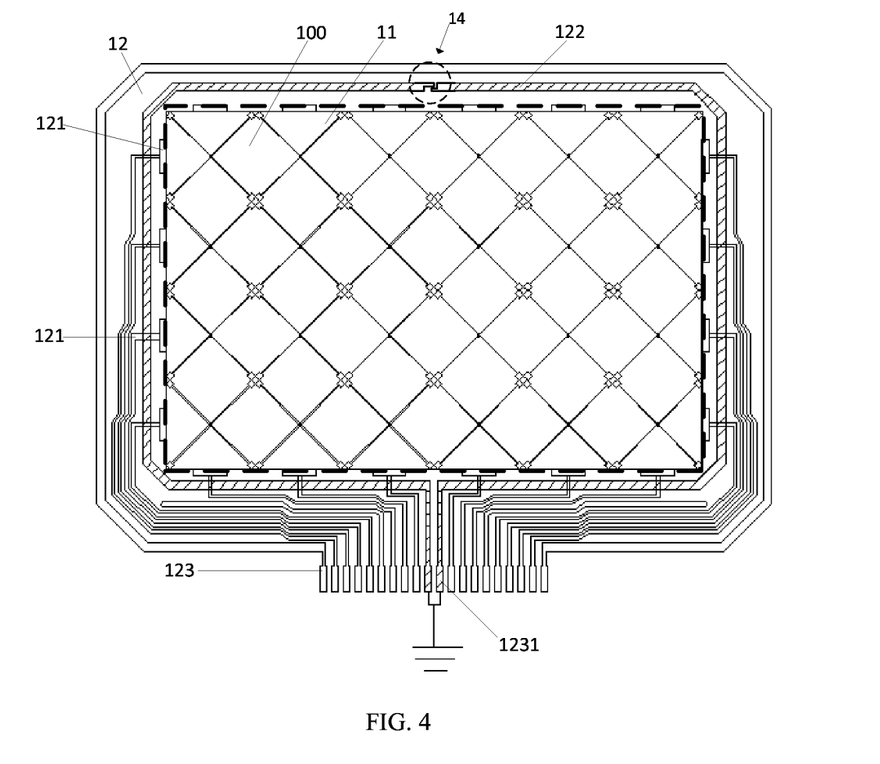
FIG. 4 is a schematic plan view of a touch control substrate according to another embodiment of the present disclosure.

FIG. 4 is a schematic plan view of a touch control substrate according to another embodiment of the present disclosure.

Referring to FIG. 4, as compared to the embodiment shown in FIG. 1, in the touch control substrate according to the present embodiment, the shielding wire 122 may be provided with an opening 14. Furthermore, there may not be a signal trace provided at a side of the opening 14 distal to the touch control region 11. Due to the opening 14, there is no a closed loop in the pattern formed by the shielding wire 122. In the case that there is a closed loop, it is likely for a long lead to collect free charges, causing electronic oscillation in the touch control region and thus affecting the touch control performance.

Figure 5:
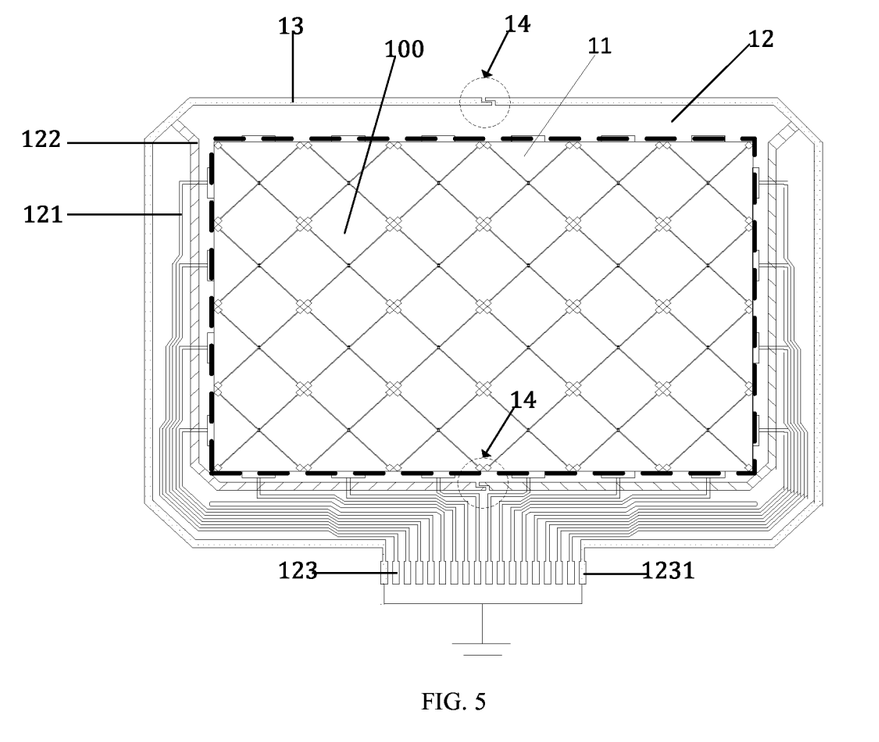
FIG. 5 is a partial enlarged schematic diagram of a touch control substrate according to another embodiment of the present disclosure.

FIG. 5 is a schematic plan view of a touch control substrate according to another embodiment of the present disclosure.

Referring to FIG. 5, as compared to the embodiment shown in FIG. 1, the touch control substrate according to the present embodiment may further include a grounding device 13 located in the periphery of the signal traces 121. The grounding device 13 is electrically connected to the shielding wire 122. According to the embodiment of the present disclosure, the grounding device 13 may be implemented as a grounding wire.

The grounding device 13 can shield the interference of external signals to the touch control substrate. The shielding wire 122 and the grounding device 13 may be formed in a same layer and connected with each other, or the shielding wire 122 may be connected to the grounding device 13 by way of a via so as to have a ground potential, thereby it is no need to provide the shielding wire 122 with a separate grounding terminal, thus simplifying the production processes and saving the production costs.

As shown in FIG. 5, each of the shielding wire 122 and the grounding device 13 is provided with an opening 14. Due to the openings 14, there is no a closed loop in the pattern formed by the shielding wire 122 and the grounding device 13. In the case that there is a closed loop, it is likely for a long lead to collect free charges, causing electronic oscillation in the touch control region and thus affecting the touch control performance. According to the embodiment of the present disclosure, only one of the shielding wire 122 and the grounding device 13 may be provided with the opening.

According to an embodiment of the present disclosure, the opening 14 may be provided at a location in the shielding wire 122 and the grounding device 13 such that the shielding effect of the shielding wire 122 on the signal traces 121 is symmetrical, and thus making the distribution of the capacitance in the touch control region 11 uniform.

As shown in FIG. 5, a plurality of signal traces 121 and one shielding wire 122 are provided in the peripheral region. The touch control substrate further includes a grounding device 13 located in the periphery of the signal traces 121. The signal traces 121 and the shielding wire 122 may be formed in a same metal pattern layer. The grounding device 13 may be formed in the same metal pattern layer as that of the signal traces 121 and the shielding wire 122. Alternatively, the grounding device 13 (e.g., a metal housing) may be fabricated separately.

The touch control substrate according to the present disclosure may be applied in various touch control device, including but not limited to a liquid crystal touch control display device.

Figure 6:
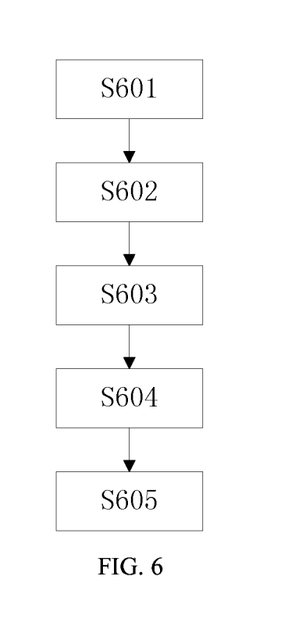
FIG. 6 is a schematic flow chart of a method for fabricating a touch control substrate according to an embodiment of the present disclosure.
Figure 7:
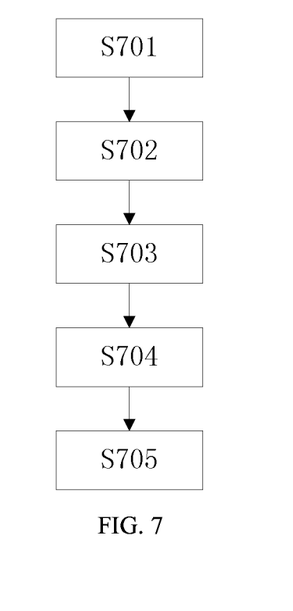
FIG. 7 is a schematic flow chart of a method for fabricating a touch control substrate according to another embodiment of the present disclosure.

FIG. 6 is a schematic flow chart of a method for fabricating a touch control substrate according to an embodiment of the present disclosure, and FIG. 7 is a schematic flow chart of a method for fabricating a touch control substrate according to another embodiment of the present disclosure.

Referring to FIGS. 1, 2 and 6, a method for fabricating a touch control substrate according to an embodiment of the present disclosure may include the following steps S601 to S605.

Step S601 includes forming a metal layer 103 above a base substrate 101 with a black matrix 102 having been formed thereon, so that the metal layer 103 is partially provided in the touch control region 11 and the peripheral region 12 so as to be electrically connected to touch control electrodes 100 provided in the touch control region 11.

Step S602 includes forming a first insulation layer 104 above the metal layer 103.

Step S603 includes forming a first via 1041 in the first insulation layer 104 to expose the metal layer 103 provided below the first insulation layer 104.

Step S604 includes forming a metal layer above the first insulation layer 104, so that the metal layer fills the first via 1041 so as to be electrically connected to the metal layer 103 below the first insulation layer 104.

Step S605 includes patterning the metal layer to form the signal traces 121 and the shielding wire 122.

The signal traces 121 are electrically connected to the metal layer 103 provided below the first insulation layer 104 through the first via 1041 in the first insulation layer 104.

The black matrix 102 is configured to form a shading region. When the metal layer 103 is formed above the black matrix 102, it may be patterned to form a metal pattern by a patterning process. The metal pattern may be connected to the touch control electrodes 100 provided in the touch control region 11. According to an embodiment of the present disclosure, the metal layer 103 may be formed by using indium tin oxide (ITO). In the case that the touch control electrodes 100 are made of ITO, the metal layer 103 and the touch control electrodes 100 may be fabricated by a single patterning process.

Moreover, as shown in FIG. 2, a second insulation layer 105 may be formed above the metal pattern layer.

Referring to FIGS. 1, 3 and 7, a method for fabricating a touch control substrate according to another embodiment of the present disclosure may include the following steps S701 to S705.

Step S701 includes forming a metal layer above a base substrate 101 with a black matrix 102 having been formed thereon.

Step S702 includes patterning the metal layer to form the signal traces 121 and the shielding wire 122.

Step S703 includes forming a first insulation layer 104 above the patterned metal layer.

Step S704 includes forming a second via 1042 in the first insulation layer 104 to expose the signal traces 121 provided below the first insulation layer 104.

Step S705 includes forming a metal layer 103 above the first insulation layer, so that the metal layer 103 fills the second via 1042 so as to be electrically connected to the signal traces 121 below the first insulation layer 104.

Moreover, as shown in FIG. 3, a second insulation layer 105 may be formed above the metal layer 103.

According to an embodiment of the present disclosure, the signal traces 121 and the shielding wire 122 may be formed in a same layer (i.e., the metal pattern layer) by a single patterning process, which can save the production time and the production costs will not be increased.

Obviously, one of ordinary skill in the art may make various modifications and variations to the foregoing embodiments without departing from the spirit and scope of the present disclosure. Thus, given that these modifications and variations fall within the scope of the claims of the present disclosure and the equivalents thereof, the present disclosure is intended to encompass these modifications and variations.

What is claimed is:

1. A touch control substrate, comprising a touch control region and a peripheral region surrounding the touch control region,
wherein signal traces and a shielding wire are provided in the peripheral region, the shielding wire surrounds all edges of the touch control region to shield interference of the signal traces to the touch control region,
wherein the touch control substrate further comprises:
a base substrate;
a conductive layer provided above the base substrate, the conductive layer being partially provided in the touch control region and the peripheral region so as to be electrically connected to touch control electrodes provided in the touch control region;
a first insulation layer located above the conductive layer, a first via being provided in the first insulation layer to expose the conductive layer provided below the first insulation layer; and
a metal pattern layer located above the first insulation layer, the metal pattern layer comprising the signal traces and the shielding wire,
wherein the signal traces are electrically connected to the conductive layer provided below the first insulation layer through the first via in the first insulation layer.

2. The touch control substrate of claim 1, wherein at least a part of the shielding wire is provided between the signal traces and the touch control region.

3. The touch control substrate of claim 2, further comprising:
a base substrate;
a conductive layer provided above the base substrate, the conductive layer being partially provided in the touch control region and the peripheral region so as to be electrically connected to touch control electrodes provided in the touch control region;
a first insulation layer located above the conductive layer, a first via being provided in the first insulation layer to expose the conductive layer provided below the first insulation layer; and
a metal pattern layer located above the first insulation layer, the metal pattern layer comprising the signal traces and the shielding wire,
wherein the signal traces are electrically connected to the conductive layer provided below the first insulation layer through the first via in the first insulation layer.

4. The touch control substrate of claim 2, further comprising:
a base substrate;
a metal pattern layer provided above the base substrate, the metal pattern layer comprising the signal traces and the shielding wire;
a first insulation layer located above the metal pattern layer, a second via being provided in the first insulation layer to expose the signal traces provided below the first insulation layer; and
a conductive layer provided above the first insulation layer, the conductive layer being partially provided in the touch control region and the peripheral region so as to be electrically connected to touch control electrodes provided in the touch control region,
wherein the signal traces are electrically connected to the conductive layer provided above the first insulation layer through the second via in the first insulation layer.

5. The touch control substrate of claim 1, further comprising:
a base substrate;
a metal pattern layer provided above the base substrate, the metal pattern layer comprising the signal traces and the shielding wire;
a first insulation layer located above the metal pattern layer, a second via being provided in the first insulation layer to expose the signal traces provided below the first insulation layer; and
a conductive layer provided above the first insulation layer, the conductive layer being partially provided in the touch control region and the peripheral region so as to be electrically connected to touch control electrodes provided in the touch control region,
wherein the signal traces are electrically connected to the conductive layer provided above the first insulation layer through the second via in the first insulation layer.

6. The touch control substrate of claim 1, wherein,
a width of the shielding wire is larger than or equal to 300 µm and smaller than or equal to 500 µm.

7. The touch control substrate of claim 1, wherein the shielding wire has an opening.

8. The touch control substrate of claim 7, wherein no signal trace is provided at a side of the opening distal to the touch control region.

9. The touch control substrate of claim 1, further comprising:
a grounding device located in a periphery of the signal traces, the grounding device being electrically connected to the shielding wire.

10. The touch control substrate of claim 9, wherein at least one of the grounding device and the shielding wire has an opening.

11. The touch control substrate of claim 10, wherein the grounding device has an opening, and no signal trace is provided at either side of the opening.

12. The touch control substrate of claim 1, wherein a line-connection region for connecting to an external integrated circuit or an external flexible printed circuit board is provided in the peripheral region, a grounding terminal is provided in the line-connection region, and the shielding wire is electrically connected to the grounding terminal.

13. The touch control substrate of claim 1, wherein the touch control substrate is a capacitive touch control substrate.

14. A touch control display device, comprising the touch control substrate of claim 1.

15. The touch control substrate of claim 1, wherein,
a width of the shielding wire is larger than or equal to 150 µm and smaller than 300 µm.

16. A method for fabricating a touch control substrate, the touch control substrate comprising a touch control region and a peripheral region surrounding the touch control region, the method comprising:
forming signal traces and a shielding wire in the peripheral region,
wherein at least a part of the shielding wire is provided between the signal traces and the touch control region, and the shielding wire surrounds all edges of the touch control region,
wherein the method further comprises:
forming a conductive layer above a base substrate with a black matrix having been formed thereon, the conductive layer is partially provided in the touch control region and the peripheral region so as to be electrically connected to touch control electrodes provided in the touch control region;
forming a first insulation layer above the conductive layer;
forming a first via in the first insulation layer to expose the conductive layer provided below the first insulation layer;

forming a metal layer above the first insulation layer, so that the metal layer fills the first via so as to be electrically connected to the conductive layer below the first insulation layer; and patterning the metal layer to form the signal traces and the shielding wire, wherein the signal traces are electrically connected to the conductive layer provided below the first insulation layer through the first via in the first insulation layer.

17. The method for fabricating a touch control substrate of claim 16, further comprising:

forming a metal layer above a base substrate with a black matrix having been formed thereon;

patterning the metal layer to form the signal traces and the shielding wire;

forming a first insulation layer above the patterned metal layer;

forming a second via in the first insulation layer to expose the signal traces provided below the first insulation layer; and forming a conductive layer above the first insulation layer, so that the conductive layer fills the second via so as to be electrically connected to the signal traces below the first insulation layer.

18. The method for fabricating a touch control substrate of claim 16, wherein, the peripheral region comprises a line-connection region for connecting to an external integrated circuit or an external flexible printed circuit board, and the method further comprises:

forming a grounding terminal in the line-connection region, so that the shielding wire is electrically connected to the grounding terminal.

* * * * *